United States Patent
Mathur

(10) Patent No.: US 10,372,600 B2
(45) Date of Patent: Aug. 6, 2019

(54) SYSTEMS AND METHODS FOR AUTOMATED WEB PERFORMANCE TESTING FOR CLOUD APPS IN USE-CASE SCENARIOS

(71) Applicant: salesforce.com, inc., San Francisco, CA (US)

(72) Inventor: Ashraya R. Mathur, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 8 days.

(21) Appl. No.: 15/446,152

(22) Filed: Mar. 1, 2017

(65) Prior Publication Data
US 2018/0253373 A1    Sep. 6, 2018

(51) Int. Cl.
*G06F 8/60* (2018.01)
*G06F 11/34* (2006.01)
*G06F 11/36* (2006.01)

(52) U.S. Cl.
CPC ........... *G06F 11/3692* (2013.01); *G06F 8/60* (2013.01); *G06F 11/34* (2013.01); *G06F 11/3664* (2013.01); *G06F 11/3688* (2013.01)

(58) Field of Classification Search
CPC .................................................. G06F 11/3692
USPC ........................................................ 717/124
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Duy Khuong T Nguyen
*Assistant Examiner* — Theodore E Hebert
(74) *Attorney, Agent, or Firm* — Lorenz & Kopf, LLP

(57) ABSTRACT

Systems and methods for measuring performance metrics of apps where a controller schedules performance testing of a plurality of apps to generate a set of performance metrics from a client, server and device relating to performance of each app wherein the generated set of performance metrics comprises processing times and requests of the app. The scheduled performance testing is executed by a combination of the client, server, and device includes different networks, operating systems, and browsers. A performance engine captures the set of performance metrics of each app from the different client, server and device, and organizes the app metrics into categories based on an instrumentation and profile of each app. The categories include clusters comprising performance metrics of the client, server, and device. A user interface renders the set of performance metrics to facilitate comparisons between each cluster and category of the set of performance metrics.

21 Claims, 12 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 * | 4/2003 | Ambrose ................ G06F 8/20 717/116 |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 * | 10/2007 | Kihneman ........ G06F 17/30719 707/752 |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 * | 8/2008 | Dillon ................ G06F 17/3056 |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,566,648 B2 * | 10/2013 | Schroeder ........... G06F 11/3672 714/38.14 |
| 8,646,103 B2 | 2/2014 | Jakobson et al. |
| 9,277,432 B2 * | 3/2016 | Mathur ................ H04W 24/08 |
| 9,600,400 B1 * | 3/2017 | McDowell .......... G06F 11/3664 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 * | 4/2003 | Mukundan ............ G06F 9/548 719/330 |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 * | 1/2006 | Hinton ................ G06F 21/41 726/10 |
| 2006/0101404 A1 * | 5/2006 | Popp ................ G06F 11/3688 717/124 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 * | 2/2012 | Cinarkaya ........... G06F 11/0709 714/57 |
| 2012/0198279 A1 * | 8/2012 | Schroeder ........... G06F 11/2294 714/32 |
| 2012/0218958 A1 | 8/2012 | Rangaiah |
| 2012/0233137 A1 | 9/2012 | Jakobson et al. |
| 2013/0007106 A1 * | 1/2013 | Tobin .................... G06F 3/0484 709/203 |
| 2013/0205010 A1 * | 8/2013 | Gupta .................... G06F 11/00 709/224 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0099493 A1 * | 4/2015 | Mathur ................ H04W 24/08 455/414.1 |

(56) References Cited

U.S. PATENT DOCUMENTS

2016/0098341 A1* 4/2016 Pho .................... G06F 11/3688
 714/38.1
2016/0314064 A1* 10/2016 Moretto ............. G06F 11/3688
2017/0322859 A1* 11/2017 Semenov ............ G06F 11/3452
2018/0174336 A1* 6/2018 Aghabeigi ............ G06T 11/206

* cited by examiner

Example: Opportunity Workspace Page

500

Opportunity
Acme - 1,200 Widgets (Sample)  +Follow                    Edit   Delete   Clone ▽

Account name      Close date                    Amount              Opportunity Owner
Acme (Sample)     8/9/2015                      $140,000.00         ○ Admin User  — 510

Proposal        Edit        Negotiation    Closed

Key Fields                                  Guidance for Success
Amount    $140,0 0 0.00                      Understand the business need and decision criteria.
Close Date  8/9/2015                          • Why is our solution a good fit
Discovery Completed                           • How is our solution better than our competitions?
                                              • What resources are available to implement the solution?

☐ Contact Roles (3)          ▶
                                                              ☐ Howard Jo....              ▶
                                                                Role: Decision Maker
                                                                Title: Buyer
                                                              ☐ Edward Sta....             ▶
                                                                Role: Economic Buyer
                                                                Title: President and CEO
                                           530 ─              ☐ Leanne To....              ▶
                                                                Role: ???? ????
                                                                Title: VP Customer Support
                                                                View All

— 515

Activity  Collaborate  Details
New Task  New Event  Email                        — 520
Subject:

Next Steps       More Steps
☐ Internal opportunity team prep call               Aug 18
  Start 8/18/2015 12:00 PM End 5/18/2015 1:00 PM    12:00PM

FIG. 5

SYSTEMS AND METHODS FOR AUTOMATED WEB PERFORMANCE TESTING FOR CLOUD APPS IN USE-CASE SCENARIOS

TECHNICAL FIELD

Embodiments of the subject matter described herein relate generally to measuring the performance of apps distributed on multiple platforms, and more particularly to an automated testing method and system for measuring app performance in virtual cross-platform and cross-browser end-to-end use-case scenarios and for gathering comprehensive measurements of metrics of transactions executed therein.

BACKGROUND

The manner apps are developed, built and deployed is changing with increasing speed. As such, real-time results of app performance are necessary wherever apps are to be deployed for measuring metrics of the app upon deployment. This type of app performance management is necessary to identify issues quickly before user complaints are realized. This requires effective monitoring tools that can identify issues of apps bottlenecks that result in a degradation of app performance and a corresponding user experience. In other words, if such bottlenecks are not immediately identified upon deployment, users are less likely to use the app again because of the negative user experience that has already occurred which eventually results in loss of user ship and wide-spread app adoption.

As apps grow in complexity and scale, measuring and monitoring such app performance in complex distributed systems is increasingly difficult requiring allocation of more resources. App performance monitoring "APM" in distributed apps involves tracking performance of individual transactions as they flow through various components, monitoring the performance of individual components, identifying the performance bottlenecks during runtime, and pin-pointing the cause of the anomaly. However, current market tools are designed for non-virtualized environments and clusters, where the apps are hosted and executed by sets of homogenous machines.

Current systems fail to provide an adequate solution for desktop, laptop, mobile and server app performance testing which is cross-platform, device independent, and is scalable. Tools for multi-platform app performance have been lagging their web based counterparts and there are no ready tools that can measure performance on mobile and server devices. Hence, systems and methods are thus needed which address these shortcomings.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 is a user-interface of an exemplary method for automatically performance testing for multiple browsers, devices, operating systems, and browsers in accordance with an embodiment;

DETAILED DESCRIPTION

Figure 1:
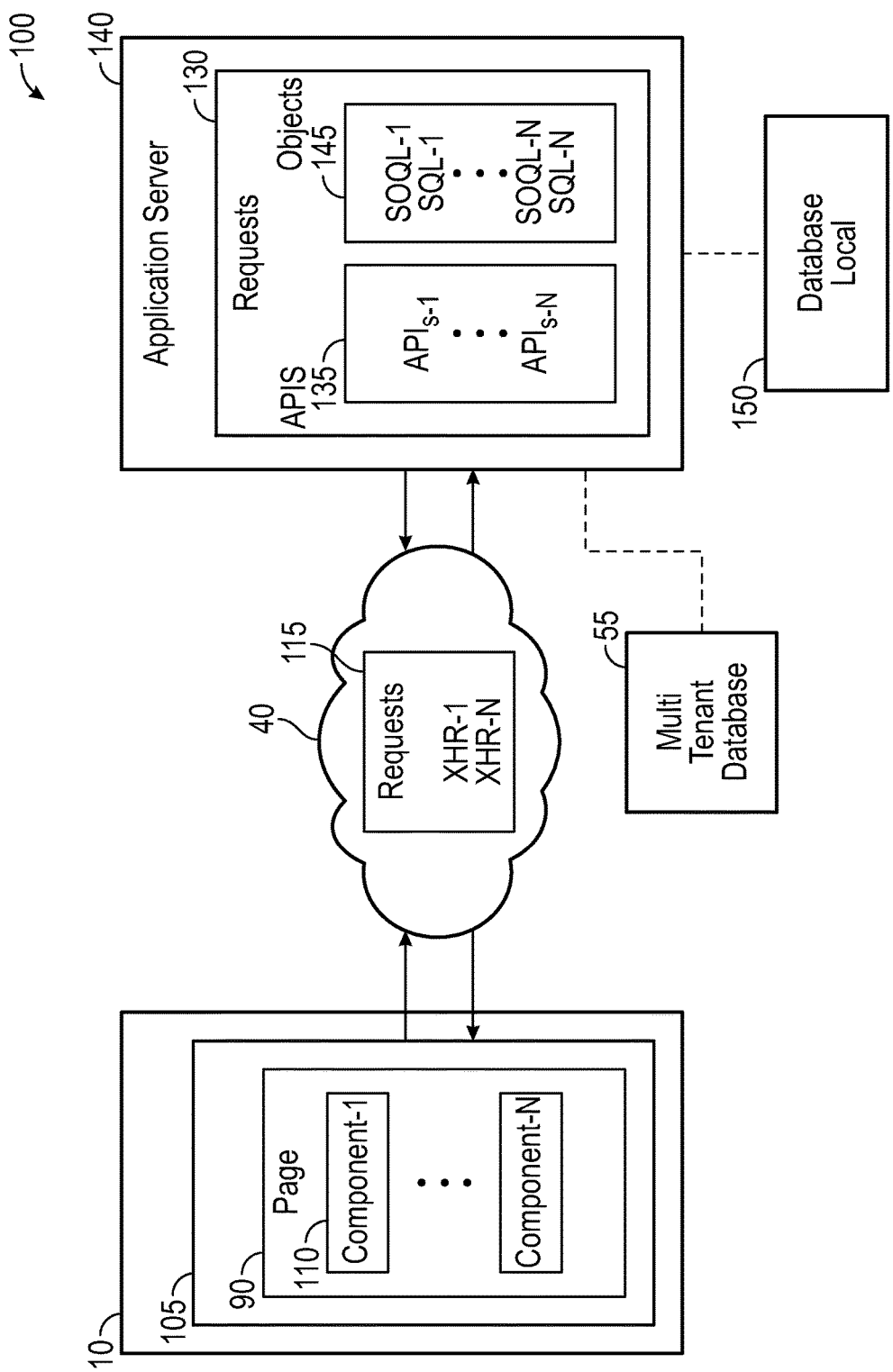
FIG. 1 is a functional diagram illustrating an automated system for measuring performance in accordance with an embodiment.

Accordingly, it is desirable to provide a framework for cross-platform and cross-browser performance testing which is capable of testing virtual apps launches and on-going executions. In addition, it is desirable to automate performance testing by gathering metrics of virtual end-to-end scenarios of app use-cases, transactions, and requests and further gather performance metrics of each app ecosystems and technology layer for such processes enabling a holistic performance measurements of the metrics of the processes.

It is desirable to integrate the performance measuring testing with app product development life cycle so developers can collect measuring metrics when actually developing and adding, subtracting or otherwise modifying features of an app in development.

It is desirable to provide automation tools that do not require manual or developer intervention to perform the performance measuring and testing, rather which provide automated actions for individual apps and feature developers to analyze performance in a chosen use case during the development cycle. In addition is desirable to have one implementation that provides a cross-platform and a cross-device framework for scalable and fully automated mobile, server and network performance testing.

It is desirable to use a multi-tenant cloud-based architectures integrated with the automated app performance and testing to improve collaboration, integration, and community-based cooperation between agents within tenant organizations without sacrificing data security. Multi-tenancy refers to a system where a single hardware and software platform simultaneously supports multiple user groups (also referred to as "organizations" or "tenants") from a common data storage element (also referred to as a "multi-tenant database").

The multi-tenant design provides a number of advantages over conventional server virtualization systems. First, the multi-tenant platform operator can often make improvements to the platform based upon collective information from the entire tenant community. Additionally, because all users in the multi-tenant environment execute apps within a common processing space, it is relatively easy to grant or deny access to specific sets of data for any user within the multi-tenant platform, thereby improving collaboration and integration between apps and the data managed by the various apps. The multi-tenant architecture therefore allows convenient and cost effective sharing of similar app features between multiple sets of users.

Embodiments of the subject matter described herein generally relate to systems and methods for measuring the performance of apps on client, server, and network devices.

In an embodiment, for a particular app under inspection, a test platform may be configured to measure performance across a test matrix including i) various operating systems (OS) for desktop, laptop, and mobile including: OSX, LINUX, iOS™ ANDROID™, WINDOWS™ and BLACKBERRY®, ii) desktop, laptop, and mobile devices (including various models) from different manufactures including SAMSUNG®, HTC™, APPLE®, HUAWEI®, LG®, LENOVO®; iii) cellular service providers such as VERIZON®, LEAP WIRELESS®, Cricket™, VIRGIN MOBILE™, AT&T®, SPRINT®, US CELLULAR™, NET10™, CLEARWIRE®, and T-MOBILE®; iii) transmission modes including Wi-Fi, LAN, 3G, 4G, LTE, and the like; and iv) web browsers including the SAFARI™ web browser, the CHROME™ web browser, the FIREFOX® web browser and the INTERNET EXPLORER® web browser. The automated test platform may be further configured to isolate that portion of the total performance which is attributable to the server, client, and network and also provide fine-grained breakdown for each of the server, client and network components, to thereby facilitate trouble shooting, debugging, and app development.

In this regard, the total time required to load an app and/or subsequent app pages may be sub-divided into three general components: the server, the client device (e.g., mobile phones/desktops/laptops/tablets), and the network (e.g., AT&T® running on 4G). In turn, each of these three components may be further subdivided into subcomponents. For example, the client portion may be divided into time associated with parsing, compute, rendering, and so on.

The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. The subject matter may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The present disclosure provides a solution to fully automate client, server, and network metrics performance testing of apps and to build a scalable performance lab for such performance testing. That is, the system mimics or simulates the user experience using a laboratory environment. The solution provides a framework for cross-platform and cross-device performance testing which virtualizes the launching and execution of apps, the controlling client, server, and network devices, the automating page-flows and the collecting of performance measurements for these page-flows. By integrating performance analysis for the client, server, and network apps into the product development lifecycle with an easy to use architecture, product developers are able to analyze performance for development use cases without requiring manual intervention.

Testing on mobile, desktop, and laptop platforms is complicated by the myriad of operating system (OS) platforms, primarily iOS, OSX, LINUX and ANDROID™ Each of these platforms comes with its own characteristics. There are many design, usability and performance differences for apps across these platforms. The differences are significant for native apps across these platforms. Even for mobile web apps, where mobile browsers often share the same web kit core, the platform specific implementations differ. This includes the graphics stack, network stack, threading, IO, memory management, and the like. For example, in a JavaScript engine, iOS uses Nitro and Chrome uses V8. These inherent differences between platforms and browsers inevitably yield different performance characteristics. Thus, expanding coverages for mobile, network and server platforms in performance testing is crucial. For efficient testing work, automation and instrumentation for apps across platforms is a most important consideration in the process.

In an embodiment, the system may employ SELENIUM™ based driver scripts to drive the user flows for aspects of the app testing across browsers. Selenium is an API for browser automation. It is primarily used to drive a real browser like the FIREFOX® web browser and the CHROME™ web browser giving exactly the same environment as the end user. An emerging alternative to a real browser is a "headless" browser like PHANTOMJS™, which is a Web Kit-based browser without any UI. Another browser alternative is a super thin framework like HttpUnit which has a simple built based on a JavaScript engine.

Additionally, SELENIUM™ Remote Control (RC) may also be used to execute tests in multiple browsers and platforms. Additionally, alternative testing scripts include CASPERJS™ is an open source navigation scripting & testing utility written in JavaScript for the PHANTOMJS™ Web Kit headless browser and SLIMERJS (Gecko). PHANTOMJS™ is a headless Web Kit with JavaScript API.

Characteristics also vary across hardware platforms. For example, tablet performance differs from a hand held phone performance due to inherent form factor differences. Within a specific form factor, performance also differs for different devices. For iOS, this is an easier problem to solve and new generation devices are typically faster than the older generation devices. For ANDROID™, the market is more fragmented and this lends its own set of problems. Testing on real devices for performance provides accurate real-user experience feedback to the development cycle.

Apps are executed by mobile, desktop, laptop and server devices and subsequent platforms across various networks (e.g., Wi-Fi, Edge, 3G, 4G, LTE), and each network has its own characteristics. The impact of bandwidth, latency and packet loss adds another dimension for performance variation for mobile apps. Simulating different network conditions in mobile performance testing is important to understand real user experience.

When performing rapid app development, there is often required quick testing and support across these clients, devices and networks. For example, frequent code check-ins often result in performance regressions across one or more of these variables. It is therefore necessary to continuously monitor app performance across this complex matrix and optimize app performance. In a job, schedulers are used to continuously and automatically run tests on code check-in and based on customized schedules. Results are collected, processed and analyzed automatically based on performance instrumentation and the results compared across browsers, devices and operating systems immediately after tests are completed.

With reference to FIG. 1, FIG. 1 is a functional diagram illustrating an automated system for measuring performance in accordance with an embodiment. A cloud based network system 100 including the components 110 of a page 90 of a client 105 communicating via a network cloud 40 to an application server 140. The client may include a browser and for communicating via the network cloud 40 to the mobile/desktop/laptop device 10 and the hosted app platform 130 by the application server 140. The network cloud 40 can include interconnected networks including both wired and wireless networks for enabling communications of the mobile/desktop/laptop device 10 via a client 105 to the server 45. For example, wireless networks may use a cellular-based communication infrastructure that includes cellular protocols such as code division multiple access "CDMA", time division multiple access "TDMA", global system for mobile communication "GSM", general packet radio service "GPRS", wide band code division multiple access "WCDMA" and similar others. Additionally, wired networks include communication channels such as the IEEE 802.11 standard better known as "Wi-Fi", the IEEE 802.16 standard better known as "WiMAX", and the IEEE 802.15.1 better known as "Bluetooth".

The network cloud 40 allows access to communication protocols and app programming interfaces that enable real-time communication over peer-to-peer connections. In addition, this may include protocols from open source software packages for on-demand apps over a cloud based network system 100. As an example, open source software package for real-time voice and video on the web, can depending on the version be integrated in the Chrome, IOS, Explorer, Safari and other browsers for peer-to-peer communications. Additionally, in-app video-chat communications through different browsers through a uniform standard set of APIs.

The mobile/desktop/laptop device 10 includes the mobile client 20 which in instances may use a mobile software development kit "SDK" platform. This SDK platform can provide one step activation of an on-demand services via an in-app application. The mobile/desktop/laptop device 10 may include any mobile or connected computing device including "wearable mobile devices" having an operating system capable of running mobile apps individually or in conjunction with other mobile or connected devices. Examples of "wearable mobile devices" include GOOGLE GLASS® and ANDROID™ watches. Additionally, connected device may include devices such as cars, jet engines, home appliances, tooth brushes, light sensors, air conditioning systems. Typically, the device will have display capabilities such as a display screens and also may have associated keyboard functionalities or even a touchscreen providing a virtual keyboard and buttons or icons on a display. Many such devices can connect to the internet and interconnect with other devices via Wi-Fi, Bluetooth or other near field communication (NFC) protocols. Also, the use of cameras integrated into the interconnected devices and GPS functions can be enabled.

The client 105 may additionally include other in-app apps as well as SDK app platform tools and further can be configurable to enable downloading and updating of SDK app platform tools. In addition, the client 105 uses an SDK platform which may be configurable for a multitude of mobile operating systems including ANDROID™ Apple® iOS, Google® ANDROID™, Research in Motion's BLACKBERRY® OS, NOKIA®'s SYMBIAM™, HEWLET-PACKARD®'s webOS (formerly Palm OS) and MICROSOFT®'s Windows Phone OS etc.

The application server 140 can be configured as a platform as a service ("Paas") that provides a host of features to develop, test, deploy, host and maintain-apps in the same integrated development environment of the app platform. Additionally, the application server 140 may be part of a multi-tenant architecture where multiple concurrent users utilize the same development apps installed on the app platform 130. Also, by utilizing the multi-tenant architecture in conjunction with the app platform 130 integration with web services and databases via common standards and communication tools can be configured. As an example, SALESFORCE SERVICECLOUD® is an app platform residing on the application server 140 may host all the varying services needed to fulfil the app development process. The SALESFORCE SERVICECLOUD® as an example, may provide web based user interface creation tools to help to create, modify, test and deploy different UI scenarios.

The app platform 130 includes apps relating to the APIs 135 and objects 145. The app platform 130 may include other apps in communication for accessing a multi-tenant database 55 as an example, in a multi-tenant database system. In addition, the agent 50 may configurable to include UIs to display video-chat communication.

The client 105 includes components 110 which comprise a page 90. In a page 90 there may a variety of different components each generating requests 115 for collecting and monitoring. In an exemplary embodiment, SALESFORCE® LIGHTNING™ is a page 90 architecture that can be tested and monitored. For example, in SALESFORCE® LIGHTNING™ the framework includes a set of prebuilt components which can be assembled and configured to form new components in an app. Components are rendered to produce HTML document object management DOM elements within the browser component can contain other components, as well as HTML, CSS, JavaScript, or any other Web-enabled code. This enables a developer to build apps with sophisticated UIs. The multiple requests 115 are executed by the event handlers and multiple requests 115 can be processed. As an example, for components 110, a request "doInit", is called when the component 110 initializes and loads the component 110 with data. Additionally, a call or request is from a app server controller by an action initiated by a client controller. In a client controller, a callback is set, which is called after the server action is completed. A server action can return any object containing serializable JavaScript Object Notation JSON data.

A client controller is a JavaScript object in object-literal notation containing name-value pairs. Each name corresponds to a client action. Its value is the function code associated with the action data of records associated with the components 110 are returned to the app platform 130 to a SQL/SOQL objects 145 when changed.

Additionally, the app platform 130 has access to other databases for information retrieval and include a local database 150 where local performance metric data may be stored. The local database 150 may be part of the multi-tenant database architecture allowing for communication with multi-tenant database 55 or other mobile clients. In addition, the app platform 130 can access a multi-tenant database 55 which is part of the multi-tenant architecture. The multi-tenant database 55 allows for enterprise customer access and the app platform 130 may be given access to the multi-tenant database dependent upon differing factors such as an associated session ID associated.

Figure 2:
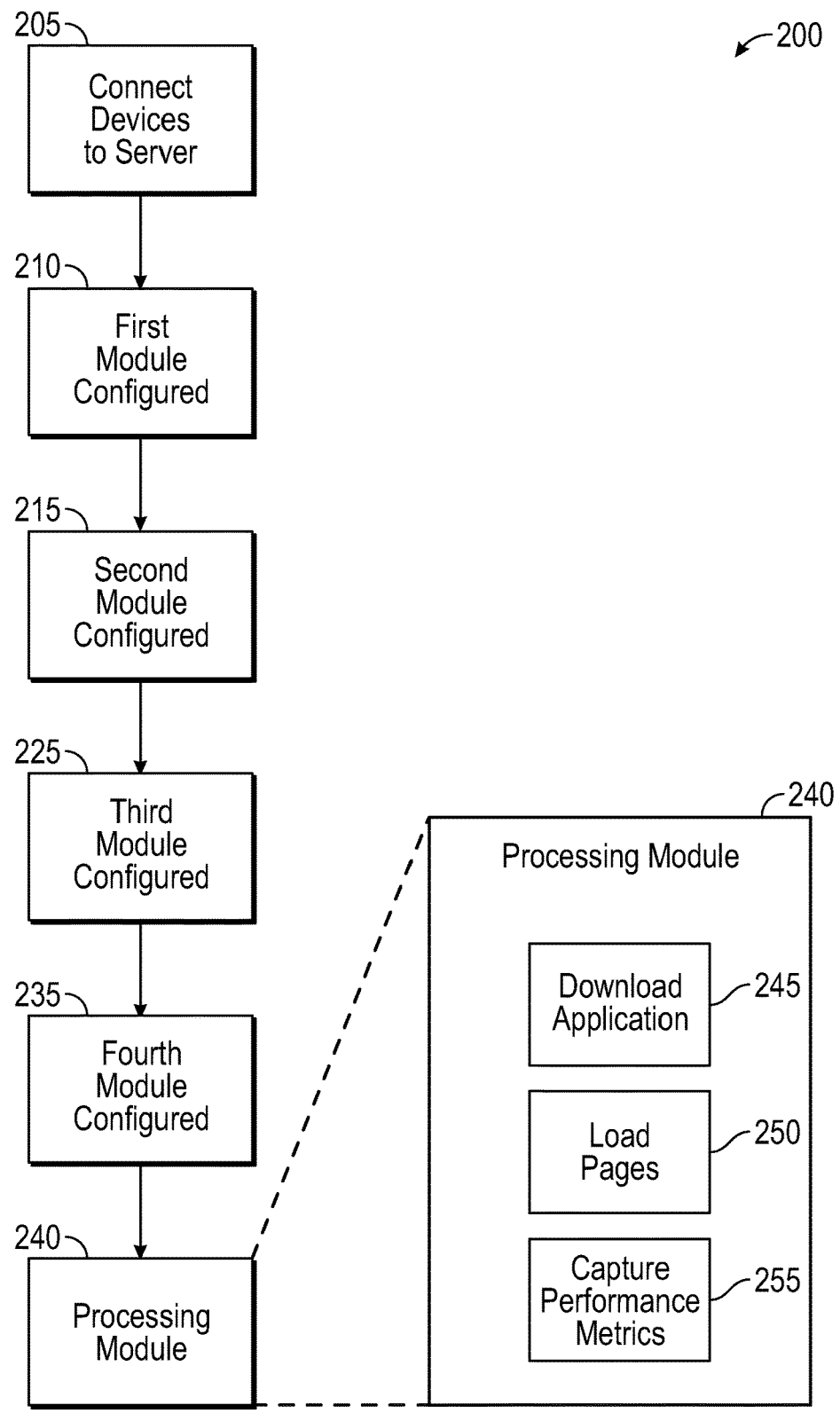
FIG. 2 is a flow chart of an exemplary method for automatically performance testing for multiple browsers, devices, operating systems, and browsers in accordance with an embodiment.

With reference to FIG. 2, FIG. 2 is a flow chart of an exemplary method 200 for automatically testing performance for multiple browsers, devices, operating systems and networks in accordance with an embodiment. More particularly, the exemplary method 200 includes: connecting (Task 205) devices to a server, configuring (Task 215) a first module to connect to a plurality of clients or client devices to an app server executing a cloud app: configuring (Task 215) a second module to implement a plurality of desktop OS systems; configuring (Task 225) a third module to implement a plurality of web browsers; configuring (Task 235) a fourth module to implement a plurality of carrier protocols; and configuring (Task 240) a processing module for downloading the app, loading the user pages and capture the performance metrics for every page across the plurality of client devices using different combinations of the plurality of network connections, the plurality of browsers, and the plurality of desktop operating systems. The method 200 may also include recording and displaying performance data associated with downloading the user page to the various client devices.

In an exemplary embodiment, the testing framework of the processing module 240 may consist of executing performance tests that can run on a number of devices, servers, and networks based on web drivers leveraging existing open source browsers and native automations. Additionally, the testing framework is used for instrumenting apps and for performance test comparison across the devices, servers and networks. The framework can consist of an architecture that divides performance testing of use cases from automation and instrumentation. The testing workload scheme can consist of multiple tests executed on parallel devices. In addition, the processing module 240 may perform a scheduling operation in executing the testing workload of the devices, servers and networks. For example, using abstracts with descriptors related to the configurations of the OS systems, web browsers, and carrier protocols for requests, calls, executions, and scheduler operations can be performed to launch apps in use case scenarios. Also, additional customization is possible by modifying the abstracts to include controls which can be implemented for device and server operations and for network path selections allowing for more automation and less manual intervention. The performance scripts used in testing the app performance are not located locally with the device but are cloud based allowing for easy automated updating and also developer manual invention of adding and removing of tests throughout the app development cycle. In addition, performance testing and app launching in use case scenarios can be triggered by events such as component firing and changes, updates of pages etc.

Figure 3:
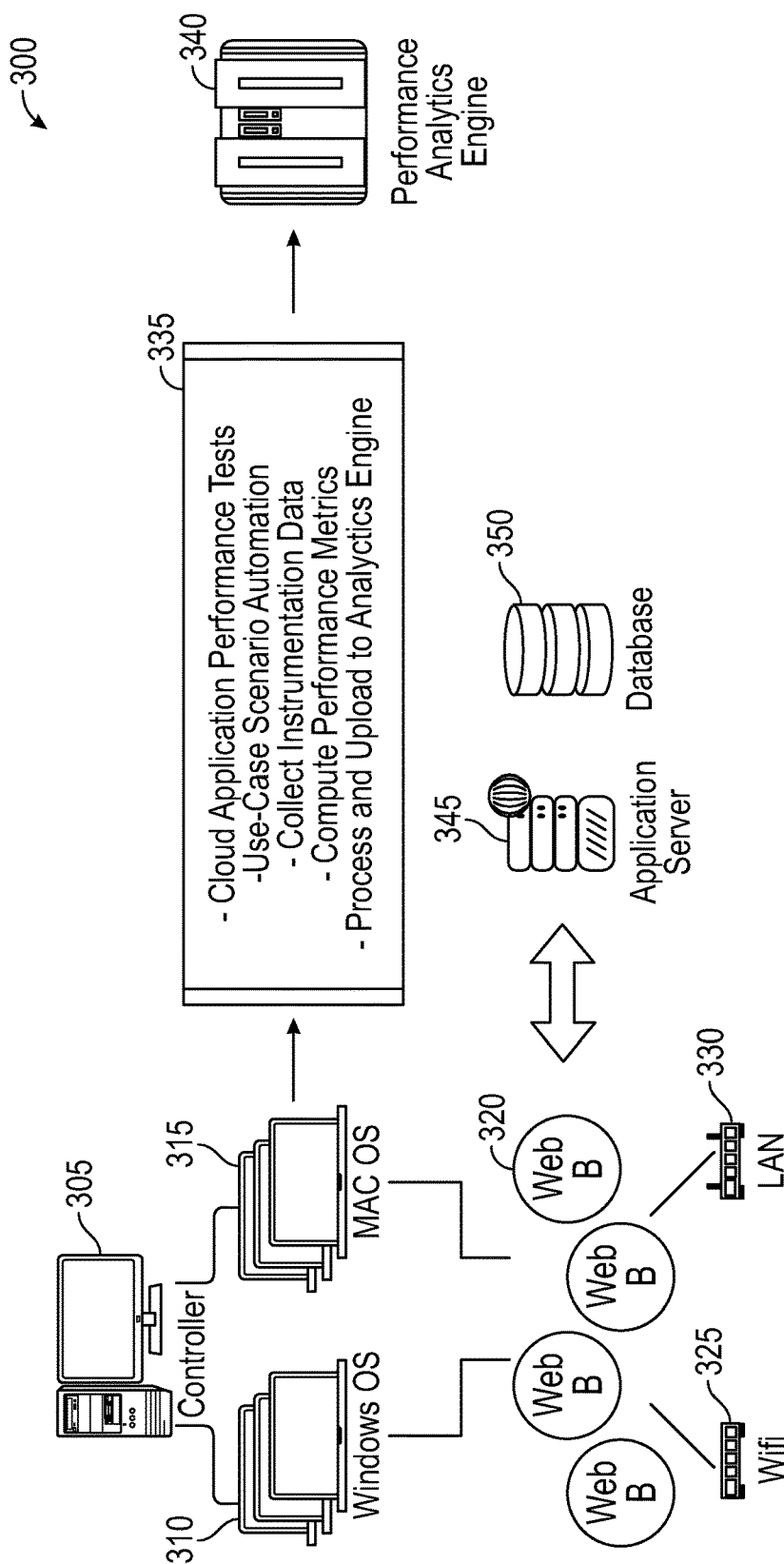
FIG. 3 is schematic diagram illustrating an automated system for measuring performance for multiple browsers, devices, operating systems, and networks in accordance with an embodiment.

With reference to FIG. 3, FIG. 3 is schematic diagram illustrating an automated system for measuring performance for multiple browsers, devices, operating systems, and networks in accordance with an embodiment. FIG. 3 illustrates a network system 300 that hosts an app server 345, plurality of web browsers 320, desktop OS of windows OS 310 and MAC™ OS 315 directed by a controller 305. Additionally, communications from the app performance testing are sent by Wi-Fi 325 or local-area network LAN 330 via the cloud to the app server 345 and subsequent performance analytics engine 340. That is, an advanced performance analytics engine 340 takes the input from the automated browser performance directed by controller 305 to capture the performance measurements 335 for each page load for a use-case scenario of the app across a plurality of client devise, desktop Oss, web-browsers, and plurality of network connections. For each combination of client devices, desktop Oss, web-browsers, and network connections, the analytics engine automatically analyses and trends each performance metric captured. By doing this, improvement or regressions are identified and captured for every feature though the app development cycle.

Additionally, the database 350 may be used to collect instrumentation metrics and store performance metrics from the advanced performance analytics engine 340. In an exemplary embodiment, the automated system the controller 305 is configured to send performance metrics to the database and render the recorded performance metrics on a user interface. The performance metrics may include, for each of the plurality of clients, servers and networks: a first time period between a download request by the client and receipt of the request by the app server; a second time period representing processing of the request by the app server; a third time period between transmitting the user page by the app server and receipt of the user page by the client; and a fourth time period between receipt of the user page by the client and rendering of the user page on the client. Additionally, the controller 305 may send performance measurements 335 of cloud app performance tests, automated use-case scenario results, collect instrumentation metrics, computer performance metric and process and upload aspects or all the performance measurements 335 to the performance analytics engine 340.

Figure 4:
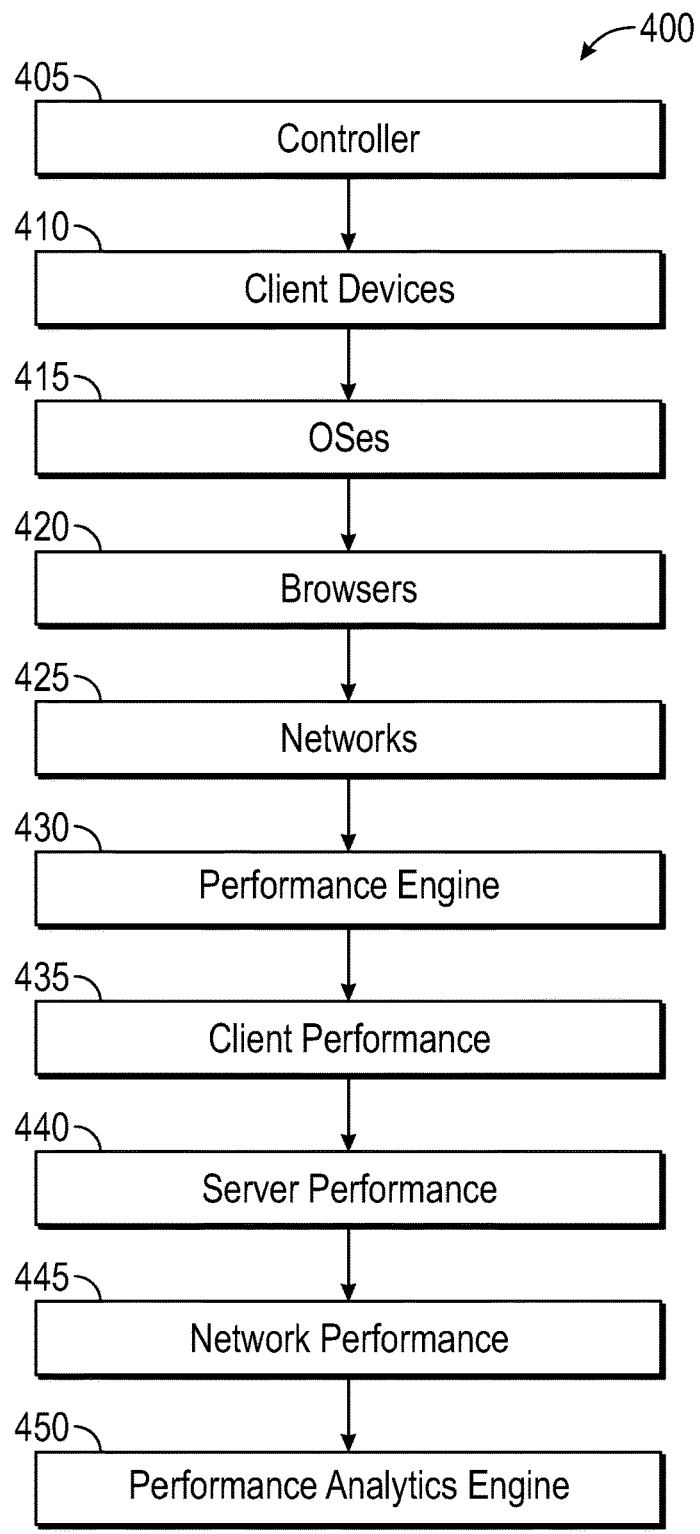
FIG. 4 is a flow chart of an exemplary method for automatically performance testing for multiple browsers, devices, operating systems, and browsers in accordance with an embodiment.

Referring to FIG. 4, FIG. 4 is a flow chart of an exemplary method for automatically performance testing for multiple browsers, devices, operating systems, and browsers in accordance with an embodiment. The system 400 includes a controller 405 as control module that is designed to coordinate performance testing of a matrix of client devices. The system 400 also includes a matrix of client devices 410 at a client level which may accommodate any number of device models from any number of manufacturers such as, for example, mobile devices of an IPHONE® I4, IPHONE® I5S, IPAD®, HTC® One x, SAMSUNG® GALAXY™ S5, LENOVO® VIBE™ X etc.; desktop devices of MACs™ (Mini, Pro), MACBOOK® (Air, Pro) Desktops, Laptops of various configurations etc. This enables the performance engine to capture metrics for different client device characteristics. The client devices may support a host of operating systems 415 such as OS X, Windows, Linux, etc. There are multiple client devices in the above module to support the different Oses, thereby enabling the performance engine to capture the performance metric for different OSes.

By non-limiting example, a variety of the client devices 410 may be connected to a server and a SELENIUM™ logger can be used to record a page flow sequence for various operating systems 415. The page flow sequence may be repeated for a variety of networks 425, browsers 420 etc., and the various metrics recorded in database (not shown). The application developer may use this data to refine debugging, trouble shooting, and to identify and isolate page flow bottlenecks.

The system 400 may include various browsers 420 such as, for example, CHROME™, FIREFOX®, INTERNET EXPLORER® and the like. The multiple client devices with the multiple OSes in the above described modules have multiple browsers configured, thereby enabling the performance engine to capture the performance metrics for different browsers, as supported for every OS/Browser combination available.

The network 425 can be arranged for network configurations with appropriate bandwidth allocations or throttling for each combination of client device, OS, browser for the available networks like Wi-Fi, LAN etc. with the appropriate throughput adjustments.

The performance engine 430 is a multi-stage performance engine including modules configured for client performance 435, server performance 440, and network performance 445 all feeding to a centralized processing by a performance analytics engine 450. In each stage, whether it is the client performance metric capture, server performance metric capture, or network performance metric capture, the processing is performed in an independent distributed manner whereby each module performs independent and different metric captures. For example, the client performance metrics captured are of page loading and rendering, time line of each loading, rendering, painting event, component loading and rendering time and client CPU profile metrics etc. The server performance metrics captures are total server processing time for each request. The totals that are captured a broken down into different layers. Each server request can have multiple "actions". There are many components on a page and each component can request information from the server using an "action". Multiple "actions" from multiple simultaneous components on the page can be batched into a single request. Each action may then call APIs which then call SQL/SOQL to execute component data/meta-data requirements. For a particular server request, the performance analytics engine 450 details the number of application services called and time taken for each call to be executed. Additionally, the performance analytics engine 450 details the number of APIs called and time taken for each to be executed. In the same token, the performance analytics engine details the number of database SQL/SOQL requests and updates. The performance analytics engine 450 for the network request metrics details the time spent in the network layer for various network combinations and associated navigation timing API metrics.

The metrics of the client, server, and network are captured by the performance analytics engine 450 were the capturing is subsequently organized by the performance analytics engine 450 based on a combination of the kind of instrumentation and profile associated with the captured metric. The instrumenting and monitoring tools associated with internal capture processes of the component data, monitor all aspects of the app performance in each of the environments of the client, server and network layers providing performance metrics and feedback of the app performance in the entire processing pipe-line. Additionally, in an exemplary example, the instrumentation metrics are relied upon closely to monitor the various components of the SALESFORCE® LIGHTNING™ end-user experience when using the app. The profiling aspects associated with the instrumentation the profiling assist in the capture of additional information in addition to instrumented performance metrics which would not ordinarily be realized without profiles. In other words, profiling assists in gaining insight into more depth metric capture not directly attributable to the instrumentation.

With reference to FIG. 5, FIG. 5 is a user-interface UI of an exemplary method for automatically performance testing for multiple browsers, devices, operating systems, and browsers in accordance with an embodiment. The UI 500 shown in the screen shot of an "opportunity workspace page" of the SALESFORCE® LIGHTNING™ which illustrates key record details in the highlights panel at the top of the page shown as block 510. In block 510 there is key record details of "needs analysis", "proposed", "negotiation", "closed" and "mark stage as complete" and key field of amount and close date and well as an edit block. A composer shown in block 515 to quickly log calls, create tasks, send emails, and to get key coaching details with a customizable sales path to support sales process.

Also in block 520 there is rendered a wealth of related information on a hover function using a quick view feature, which allows viewing without the opportunity page of the UI 500. In block 530 a user can add related records like contacts in context with minimal clicks. has multiple of events and requests for execution. The UI 500 relies on multiple components for the various block operations. In fact, in such an UI 500 the potential number of components may be significant.

For example, SALESFORCE® LIGHTNING enables a user to use navigate tools through pages for more easily with space-saving, collapsible left navigation menu, which can be customize for various types of users (such as sales reps, sales manager, or execs). Additional functions such as open tasks, planned meetings, and accomplishments in the activity timeline on each opportunity, lead, account, and contact as well as finding tasks on a new page for tasks, including the new master-detail view to see a single task and the entire list of tasks side by side. All these user experiences rely on execution of components and for each execution page time, browser processing time, server processing time and network processing time metrics are generated and need to be captured for detailed monitoring.

In other words, the opportunity work space generates a series of requests, calls and execute times with respect to each block and each function. That is client metrics of the UI 500 are generated as well as client cache stats and network metrics associated with page requests and calls. As an exemplary example, the client performance metrics captured are of loading of the opportunity workspace page and rendering of the UI 500. Also, each of the blocks and the component loading and rendering time as well as the client profile processing time. The server performance metrics captures are total server processing time for each request, execution, caching and API metric of the opportunity work page.

Figure 6:
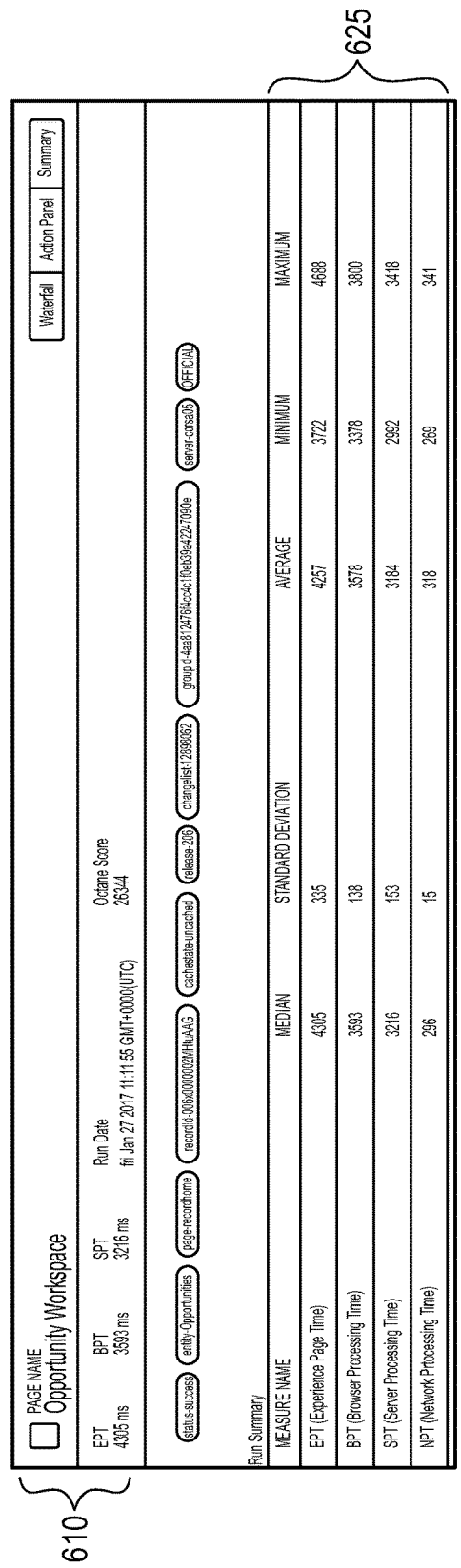
FIG. 6 is a user-interface of an exemplary method for automatically performance testing for multiple browsers, devices, operating systems, and browsers in accordance with an embodiment.

With reference to FIG. 6, FIG. 6 is a user-interface of an exemplary method for automatically performance testing for multiple browsers, devices, operating systems, and browsers in accordance with an embodiment. The exemplary "opportunity workspace" page of the SALESFORCE® LIGHTNING™ analysis displaying in an UI 600 metrics of the processing times of metric totals 625 of component actions of a page and the data of the test 610 performed including the test execution time is shown. As an exemplary example, in SALESFORCE® LIGHTNING™ when a user clicks a button that requires the component to retrieve data from the server, then events can be triggered by actions or other events. Next, the user clicks a button or interacts with a component, triggering a browser event. For example, the user may save data from the server when the button is clicked. The button click invokes a client-side JavaScript controller, which provides some custom logic before invoking a helper function. The JavaScript controller invokes a helper function. The helper function calls a controller and queues the action. In an exemplary example, in SALESFORCE® LIGHTNING™ an "Apex" controller method is invoked and data is returned. A JavaScript callback function is invoked when the Apex method is completed. The JavaScript call-back function evaluates logic and updates the components monitored in UI 600. The user sees the updated component on the page. Each test combination (such as a combination of a device, operating system OS, browser, and network) is repeated over a statistically significant sample size to arrive at this performance data in 625. From which a statistical average, median, 95th percentile etc. can be determined from the sample. The totals for the component actions associated with the page, browser, server and networks for series of such user actions is captured and total by the performance analytic engine and shown in 625 of the UI 600.

Figure 7:
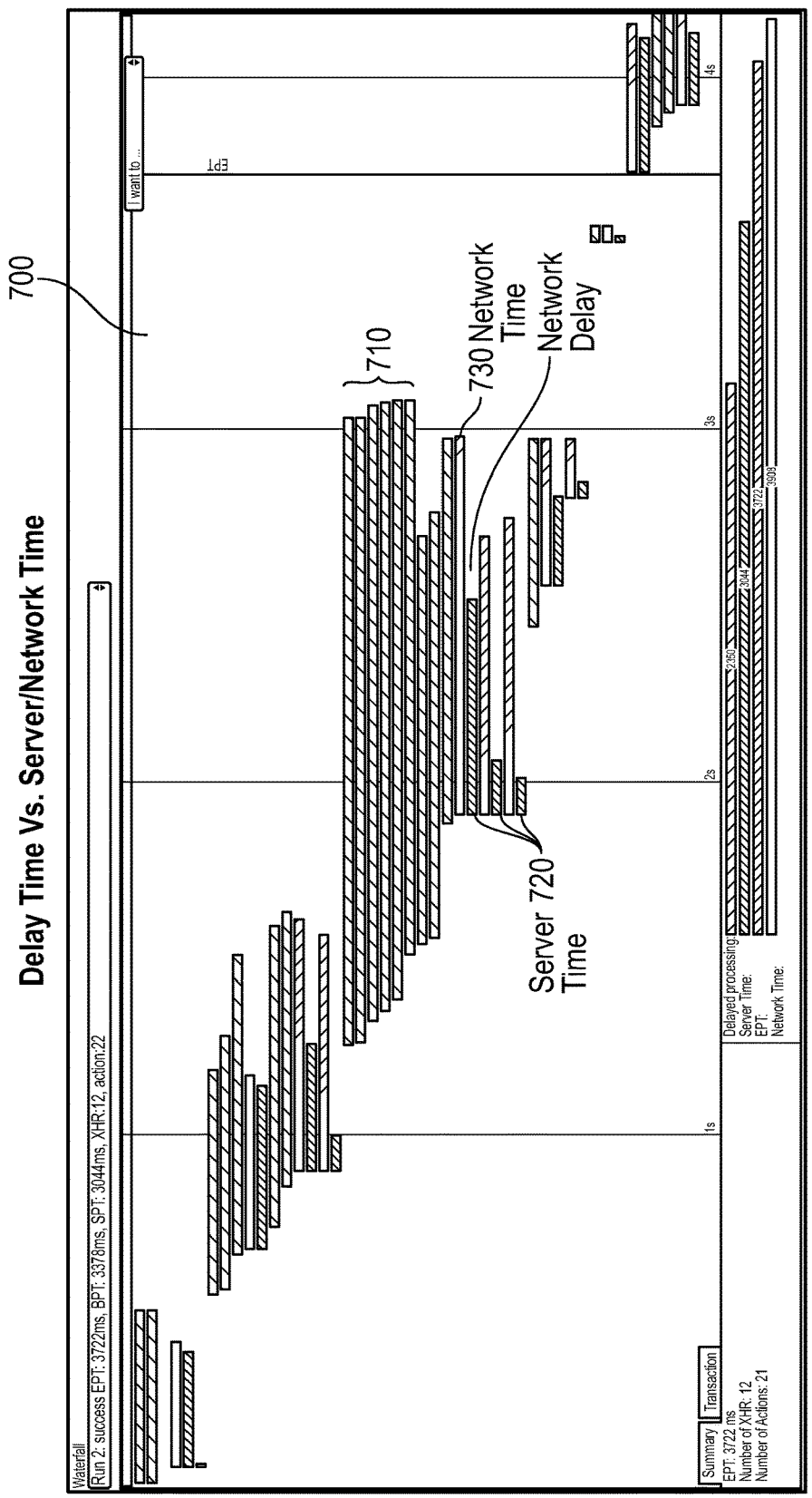
FIG. 7 is a waterfall graph of instrumentation time for event logs of an exemplary method for automatically performance testing for multiple browsers, devices, operating systems, and browsers in accordance with an embodiment.

With reference to FIG. 7, FIG. 7 is a waterfall graph of instrumentation time for event logs in accordance with an embodiment. FIG. 7 illustrates in waterfall graph 700 event logging and processing time for events at the client, server and network. The waterfall graph 700 enables an app developer to visually monitor processing at different stages of the instrumentation and gives insight about a component or event processing at each stage. For example, an event may be processed faster at the server versus the network. There may be bottlenecks discerned at the network due to bandwidth allocation. In any event, by visually viewing the processing times of the instrumentation of the testing and monitoring debugging and amount of processing required for apps can be easily discovered. In an exemplary embodiment, the delay time 710 can be compared with the server time 720 and network time 730. Hence, app execution time across the server and the network can easily be assessed. Moreover, in a multi-tenant environment, resource sharing requires balancing app performance and processing capabilities of the instrumentations. Therefore, by visually indicating in a waterfall graph as lengths of processing times, processing times of instrumentations are easily understood during app development.

Figure 8:
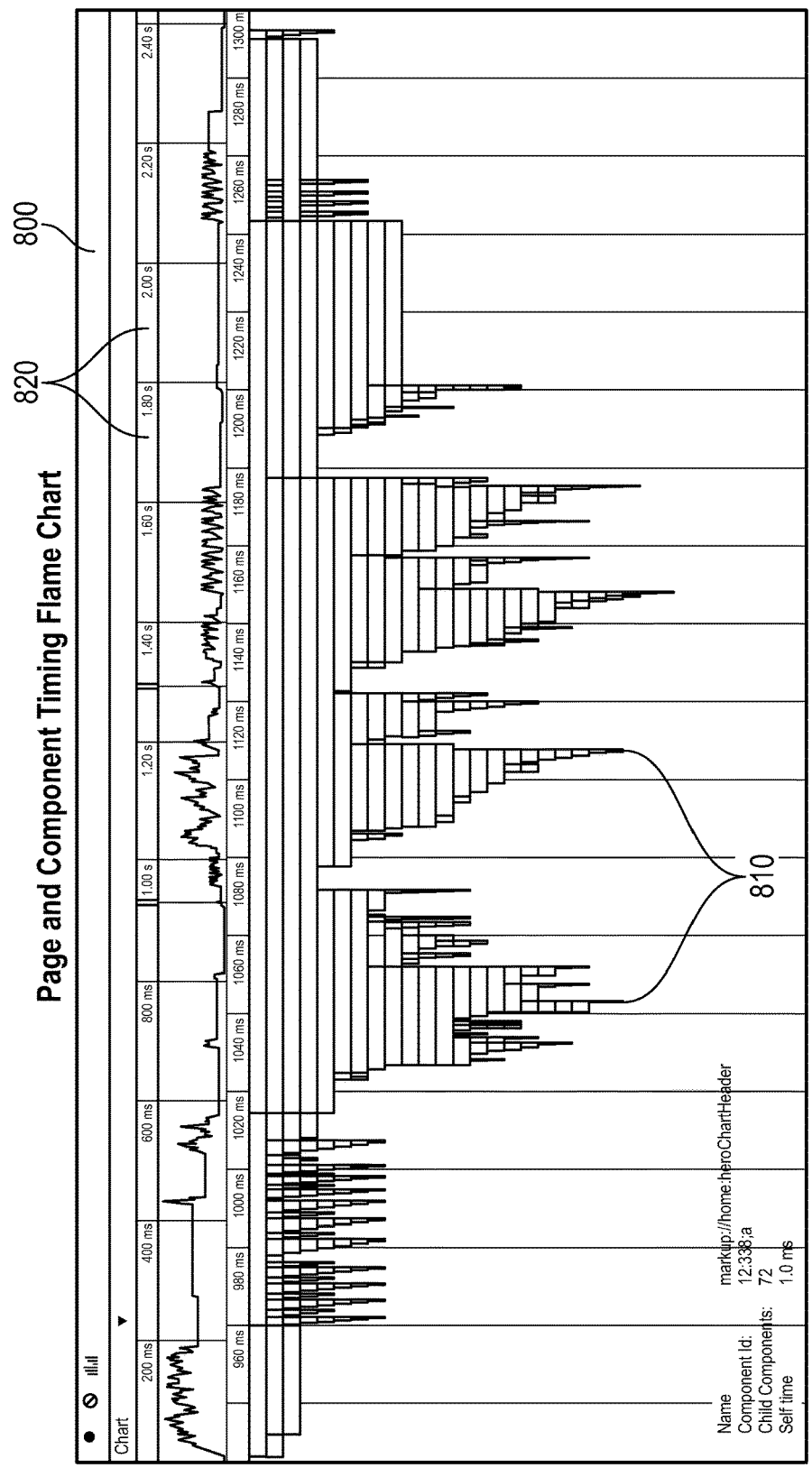
FIG. 8 is a flame chart of discrete events versus time for a typical page flow of an exemplary method for automatically performance testing for multiple browsers, devices, operating systems, and browsers in accordance with an embodiment.

With reference to FIG. 8, FIG. 8 illustrates a flame chart of discrete events versus time for a typical page flow in accordance with an embodiment. The flame graph 800 illustrates the creation time for components. Portions of the flame graph 800 may indicate potential performance bottlenecks. In addition, depth 810 in the flame chart shows a more detailed information about that component. This information includes the component complexity and timing information, and can help to diagnose performance issues. A window 820 enables the user to inspect component creation time for potential performance hot spots.

In reference to the flame graph 800, it is worth discussing a component parent child configuration. The component lifecycle starts when the client sends an HTTP request to the server and the component configuration data is returned to the client. No server trip is made if the component definition is already on the client from a previous request and the component has no server dependencies. If an app has several nested components which results in the depth 810 of flame graph 800 and child components. The framework instantiates the app and proceeds on a path of execution through the children to create each component, First, it creates the component definition, its entire parent hierarchy, and then creates the facets within those components. The framework also creates any component dependencies on the server, including definitions for attributes, interfaces, controllers, and actions. After creating a component instance, the serialized component definitions and instances are sent down to the client. Definitions are cached but not the instance data. The client DE serializes the response to create the JavaScript objects or maps, resulting in an instance tree that is used to render the component instance. When the component tree is ready, the initialization event is fired for all the components, starting from the children component and finishing in the parent component, hence for processing time of a component may be exponentially increased by an order depending on the children components needed to create the component.

Figure 9:
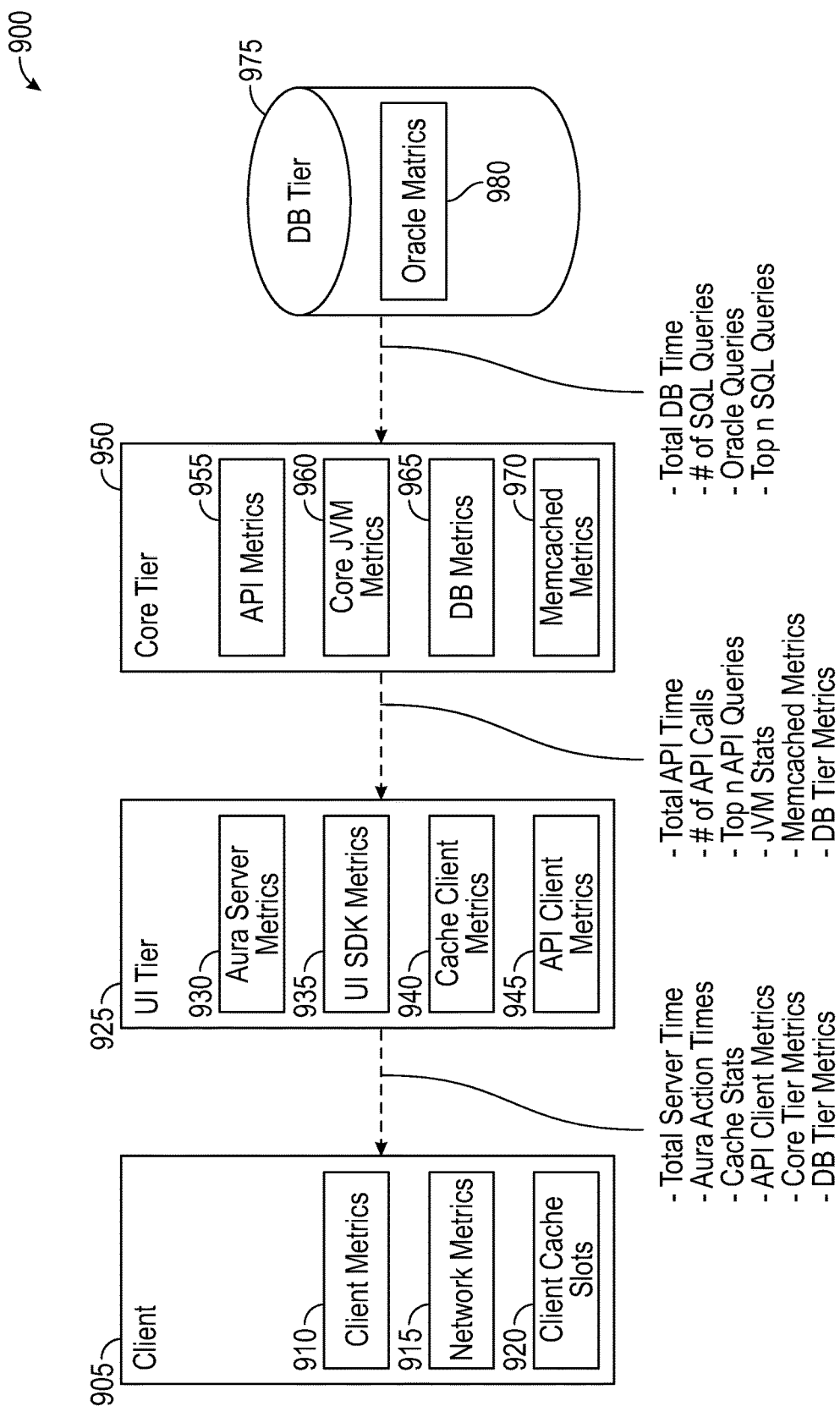
FIG. 9 is an is schematic diagram illustrating an automated system of an exemplary method for automatically performance testing for multiple browsers, devices, operating systems, and networks in accordance with an embodiment.

With reference to FIG. 9, FIG. 9 is an is schematic diagram illustrating an automated system for measuring performance for multiple browsers, devices, operating systems, and networks in accordance with an embodiment. The instrumentation data capture from a page at the client, network and memory of API client metrics, APIs/SQL/SOQL and database DB tier metrics is collated in the data across the client, user interface tier, core processing tier and database tier. FIG. 9 shows the performance and testing metrics for the instrumentation in various layers of the client 905, the user interface UI 925, the core tier 950, and the database tier 975. In an exemplary embodiment, the instrumentation metrics of the client 905 consists of instrument metrics of client metrics 910 itself, network metrics 915 and client cache metrics 920 associated with the component processing at the client. From summations of the instrument metrics of the client by the performance analytics engine (not shown), totals of processing metrics of the components or events of the total server time, execution time, cache stats, number of APIs used, core tier metrics and database metrics can be generated by algorithmic solutions.

Instrument metrics can be generated at the user interface UI 925 of server metrics 930, UI SDK metrics 935, cache client's metrics 940 and API client metrics 945 by the performance analytics engine. From these instrument metrics at the user interface UI 925, processing of the components or events of the total API time, number of API calls, top "N" queries, JVM stats, memcached metric, and data tier metrics can be generated. Instrumentation metrics at core tier 950 which can be generated are the API metrics 955, Core JVM metrics 960, Database Metrics 965 and memcached metrics 970. Additionally, from the core tier 950 metrics, summations can be determined of the total database execution time, the number of SQL queries, statistics of the Oracle® database, and top "N" SQL queries. The database tier 975 includes the Oracle® metrics 980 which are sent to the core tier 950.

Below is an exemplary embodiment of script which when executed captures performance metrics from an example page.

```
...
{"perf": {
    "request ID": "352516500006941aeb",
    "perf": {
        "version": "1.0.0",
        "calls": [{
                "name": "http-request",
                "start Time": 1458265337724,
                "total Time": 268
            },
            {
                "name": "db-exec",
                "sql": "{?=callcAuthSession.get_session_nc(?,?,?)}"},
            ...
        "summary":[{
                "http-request":{"totalTime":268,"totalCalls":1},
                "api":{"totalTime":172,"totalCalls":2},
                "cache-memcached":{"totalTime":8,"totalCalls":27},
                "db-exec":{"totalTime":40,"totalCalls":14},
                ...
    }
```

A request is made having an initial "request ID" corresponding to request from the client. As an exemplary example, the request can be request from a client to an application server or a network cloud. Then a call or response to the initial request may occur as shown above with a marker of a start time and total time of a hypertext transfer protocol request "http-request" in a page. Also, an http-request can include a first line of the message, the method to be applied to the resource, the identifier of the resource, and the protocol version in use. A driver execution "db-exec" step is called to execute a SQL statements which here is to get session information "callAuthSession.getsession". This db-exec driver execution does not return a record but summary data. The summary data returned is a generated of set of metrics about the functions of" http-request", Application program interface API, memory caching "cache-memcached", and driver execution "db-exec" where the summary of the attributes of the function are divided into two categories of the total time "total Time" of each function and total number of calls "total calls" of each function.

The performance analytics engine (illustrated in FIG. 3) analyses each of the sum totals captured by the capture script. As an exemplary embodiment, for each combination of the above, the analytics engine automatically analyses and trends each performance metrics captured, thereby capturing any improvement or regression for every feature through the application development lifecycle. The performance analytics engine also provides drill-down analysis, reporting and dashboards for each of the combination of the above. In an exemplary embodiment, the performance analytics engine provides breakdown of total request times in each of the different app layers, the number of app services called and time taken for each call; the number of APIs called and time taken for each API call; and the number of database SQL/PLSQL statement executed.

Figure 10:
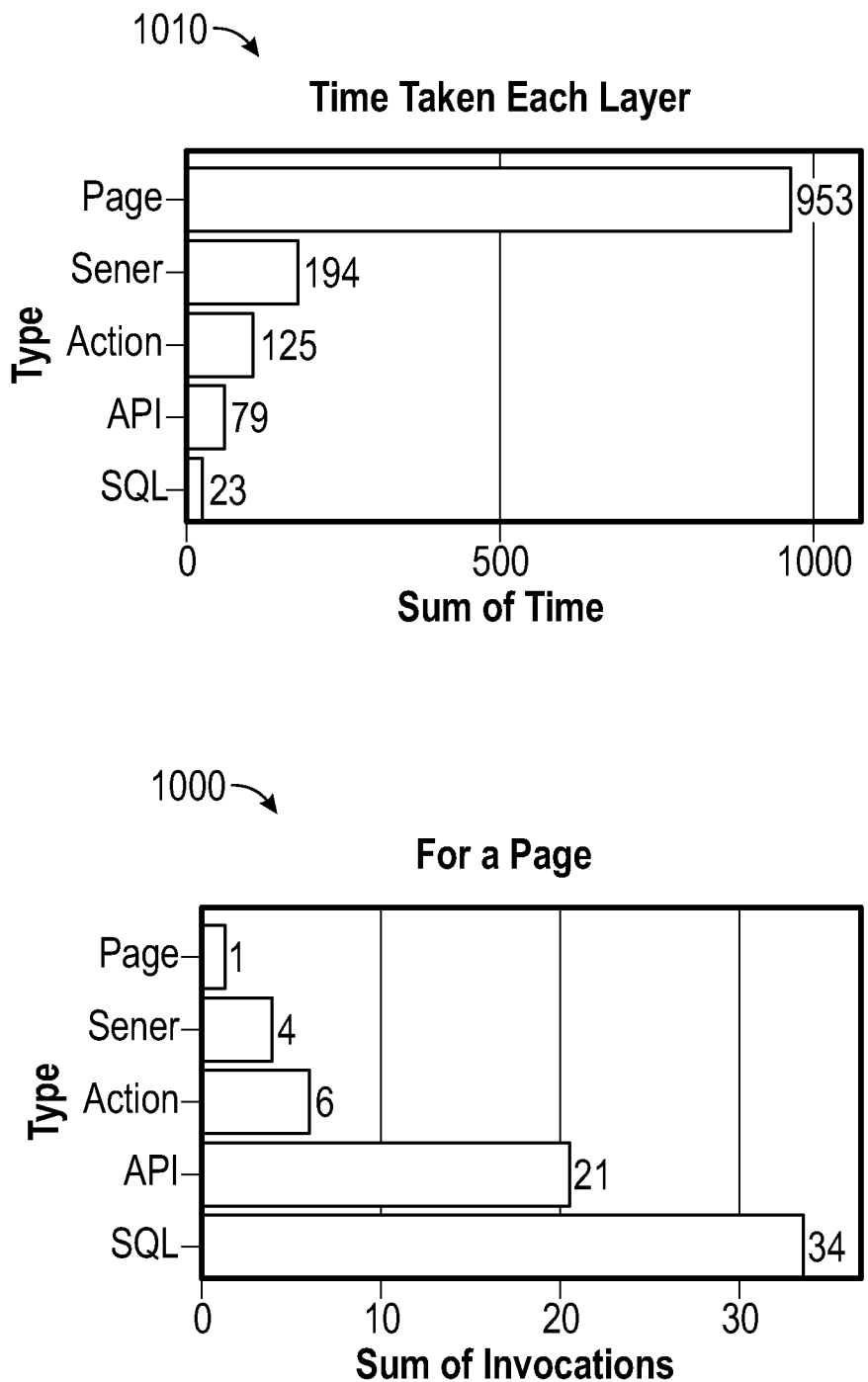
FIG. 10 is a graph of discrete events versus time for a typical page and summations in flow of an exemplary method for automatically performance testing for multiple browsers, devices, operating systems, and networks in accordance with an embodiment.

FIG. 10 are graphs of discrete events versus time for a typical page and summations in flow in accordance with an embodiment. In FIG. 10 a summation of the invocations for each page is shown in graph 1000. In the exemplary embodiment, for a single page there is shown four invocations to the server, six actions, twenty-on API calls, and thirty SQL calls. In FIG. 10 the summations of time for each layer of the page and server and summations of time for actions, APIs and SQLs are shown in graph 1010. For a total time period of 963 for page invocations, the server processing time is 194, the action processing time is 125, the API processing time is 79 and the SQL processing time is 23.

Figure 11:
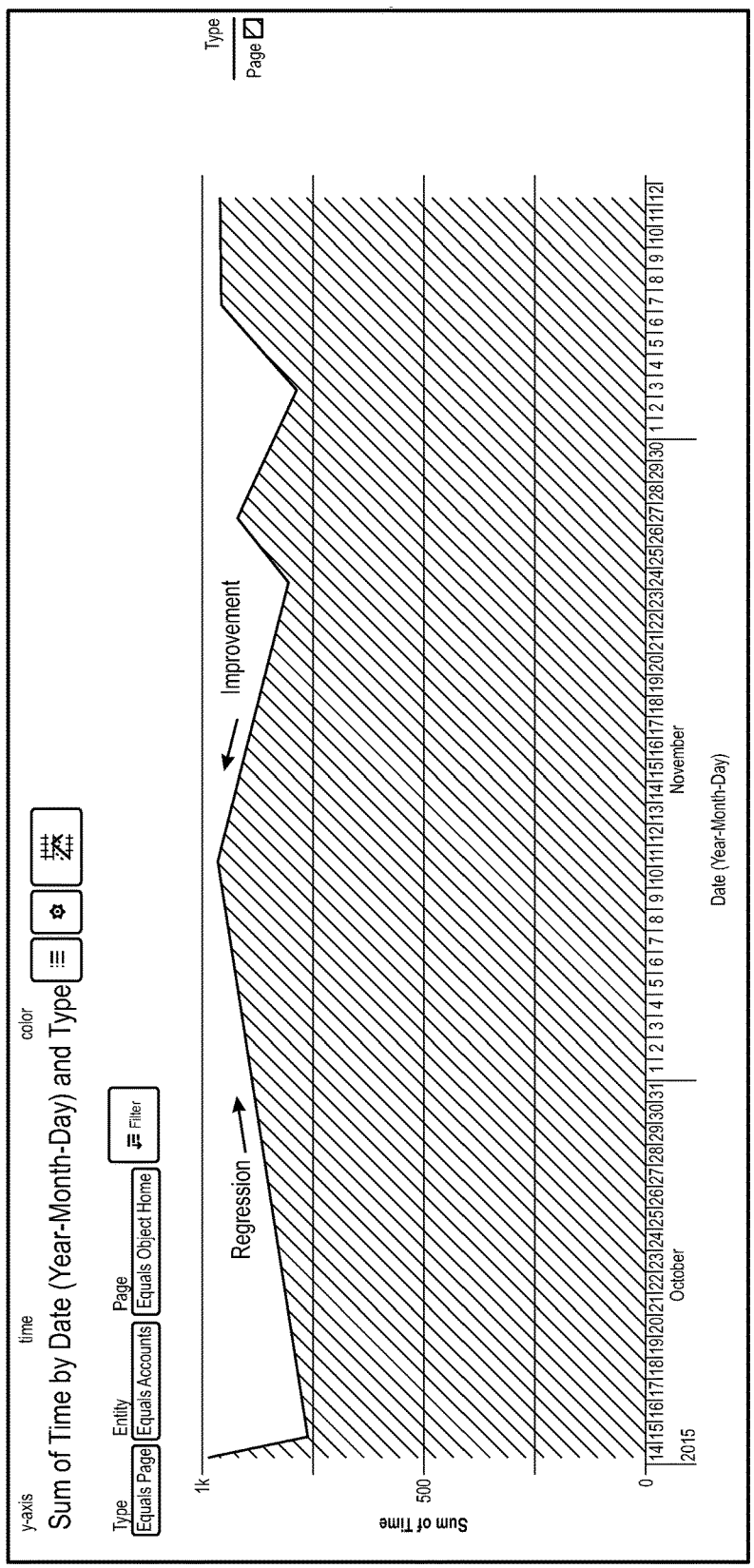
FIG. 11 is a graph of discrete events trends versus time for a typical page flow of an exemplary method for automatically performance testing for multiple browsers, devices, operating systems, and networks in accordance with an embodiment.

FIG. 11 is a trend graph of discrete events trends versus time for a typical page flow in accordance with an embodiment. The trend graph shows the trending of any performance metric for any page or an underlying layer related to the page. In addition, by the upward or downward direction of the graph, regressions or improvements of performance metrics as the result of features added or removed in the app development cycle can be isolated with respect to the app performance in the trend graph.

Figure 12:
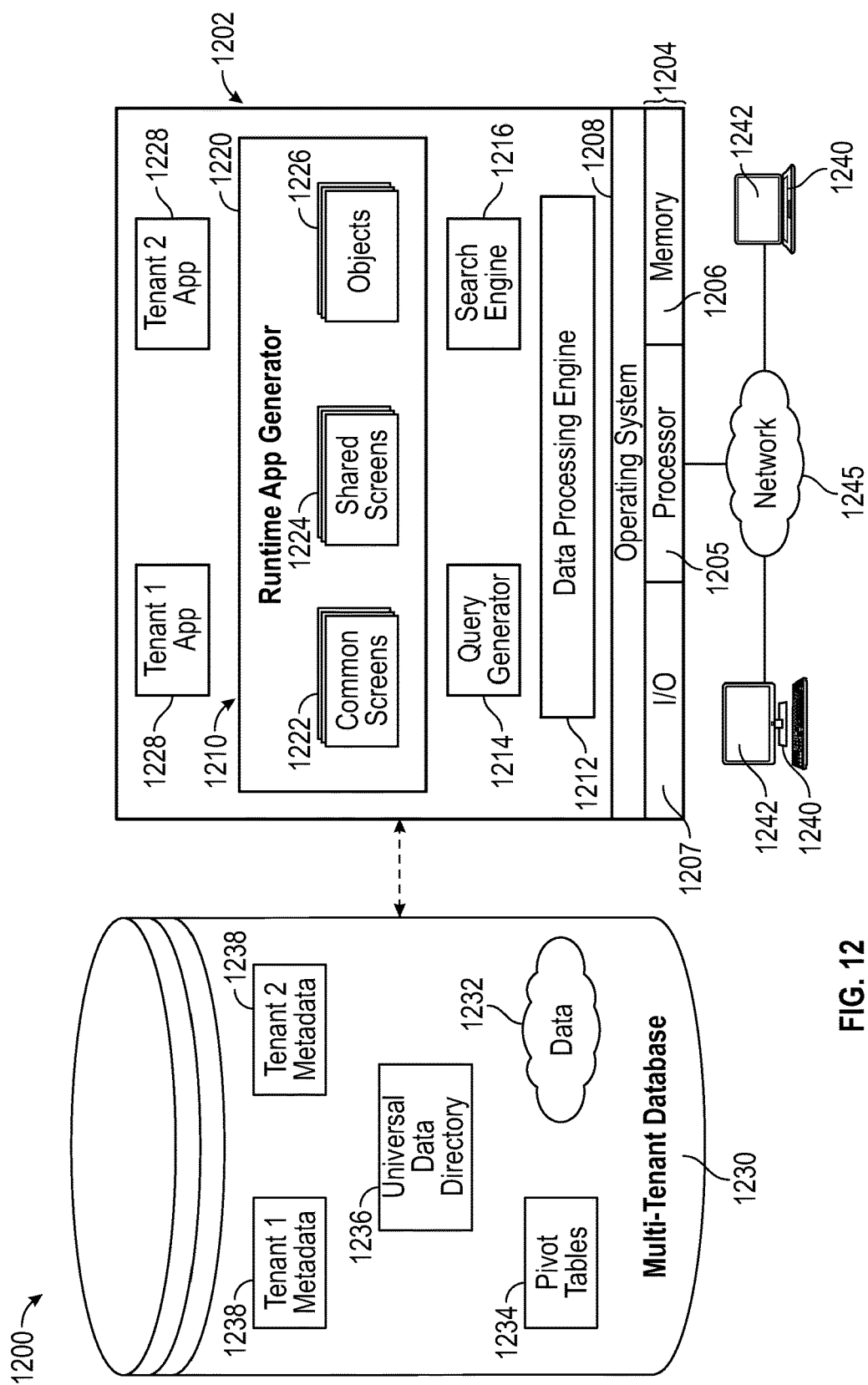
FIG. 12 is a schematic block diagram of a multi-tenant computing environment of an exemplary method for automatically performance testing for multiple browsers, devices, operating systems, and networks in accordance with an embodiment.

With reference to FIG. 12, FIG. 12 is a schematic block diagram of a multi-tenant computing environment in accordance with an embodiment. FIG. 12 is a schematic block diagram of a multi-tenant computing environment for use in conjunction with the communication process of the object sharing of the mobile client and agent in accordance with an embodiment. A server may be shared between multiple tenants, organizations, or enterprises, referred to herein as a multi-tenant database. In the exemplary disclosure, video-chat data and services generated by are provided via a network 1245 to any number of tenant devices 1240, such as desk tops, laptops, tablets, smartphones, Google Glass™ and any other computing device implemented in an automobile, aircraft, television, or other business or consumer electronic device or system, including web tenants.

Each app 1228 is suitably generated at run-time (or on-demand) using a common type of app platform 1210 that securely provides access to the data 1232 in the multi-tenant database 1230 for each of the various tenant organizations subscribing to the service cloud 1200. In accordance with one non-limiting example, the service cloud 1200 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 1230. In this regard, each tenant includes one or more users and/or groups associated with, authorized by, or otherwise belonging to that respective tenant. Stated another way, each respective user within the multi-tenant system of the service cloud 1200 is associated with, assigned to, or otherwise belongs to a particular one of the plurality of enterprises supported by the system of the service cloud 1200.

Each enterprise tenant may represent a company, corporate department, business or legal organization, and/or any other entities that maintain data for particular sets of users (such as their respective employees or customers) within the multi-tenant system of the service cloud 1200. Although multiple tenants may share access to the server 1202 and the multi-tenant database 1230, the particular data and services provided from the server 1202 to each tenant can be securely isolated from those provided to other tenants. The multi-tenant architecture therefore allows different sets of users to share functionality and hardware resources without necessarily sharing any of the data 1232 belonging to or otherwise associated with other organizations.

The multi-tenant database 1230 may be a repository or other data storage system capable of storing and managing the data 1232 associated with any number of tenant organizations. The multi-tenant database 1230 may be implemented using conventional database server hardware. In various embodiments, the multi-tenant database 1230 shares the processing hardware 1204 with the server 1202. In other embodiments, the multi-tenant database 1230 is implemented using separate physical and/or virtual database server hardware that communicates with the server 1202 to perform the various functions described herein.

In an exemplary embodiment, the multi-tenant database 1230 includes a database management system or other equivalent software capable of determining an optimal query plan for retrieving and providing a particular subset of the data 1232 to an instance of app (or virtual app) 1228 in response to a query initiated or otherwise provided by an app 1228, as described in greater detail below. The multi-tenant database 1230 may alternatively be referred to herein as an on-demand database, in that the multi-tenant database 1230 provides (or is available to provide) data at run-time to on-demand virtual apps 1228 generated by the app platform 1210, as described in greater detail below.

In practice, the data 1232 may be organized and formatted in any manner to support the app platform 1210. In various embodiments, the data 1232 is suitably organized into a relatively small number of large data tables to maintain a semi-amorphous "heap"-type format. The data 1232 can then be organized as needed for a particular virtual app 1228. In various embodiments, conventional data relationships are established using any number of pivot tables 1234 that establish indexing, uniqueness, relationships between entities, and/or other aspects of conventional database organization as desired. Further data manipulation and report formatting is generally performed at run-time using a variety of metadata constructs. Metadata within a universal data directory (UDD) 1236, for example, can be used to describe any number of forms, reports, workflows, user access privileges, business logic and other constructs that are common to multiple tenants.

Tenant-specific formatting, functions and other constructs may be maintained as tenant-specific metadata 1238 for each tenant, as desired. Rather than forcing the data 1232 into an inflexible global structure that is common to all tenants and apps, the multi-tenant database 1230 is organized to be relatively amorphous, with the pivot tables 1234 and the metadata 1238 providing additional structure on an as-needed basis. To that end, the app platform 1210 suitably uses the pivot tables 1234 and/or the metadata 1238 to generate "virtual" components of the virtual apps 1228 to logically obtain, process, and present the relatively amorphous data from the multi-tenant database 1230.

The server 1202 may be implemented using one or more actual and/or virtual computing systems that collectively provide the dynamic type of app platform 1210 for generating the virtual apps 1228. For example, the server 1202 may be implemented using a cluster of actual and/or virtual servers operating in conjunction with each other, typically in association with conventional network communications, cluster management, load balancing and other features as appropriate. The server 1202 operates with any sort of processing hardware 1204 which is conventional, such as a processor 1205, memory 1206, input/output features 1212 and the like. The input/output features 1212 generally represent the interface(s) to networks (e.g., to the network 1245, or any other local area, wide area or other network), mass storage, display devices, data entry devices and/or the like.

The processor 1205 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1206 represents any non-transitory short or long term storage or other computer-readable media capable of storing programming instructions for execution on the processor 1205, including any sort of random access memory (RAM), read only memory (ROM), flash memory, magnetic or optical mass storage, and/or the like. The computer-executable programming instructions, when read and executed by the server 1202 and/or processor 1205, cause the server 1202 and/or processor 1205 to create, generate, or otherwise facilitate the app platform 1210 and/or virtual apps 1228 and perform one or more additional tasks, operations, functions, and/or processes described herein. It should be noted that the memory 1206 represents one suitable implementation of such computer-readable media, and alternatively or additionally, the server 1202 could receive and cooperate with external computer-readable media that is realized as a portable or mobile component or platform, e.g., a portable hard drive, a USB flash drive, an optical disc, or the like.

The app platform 1210 is any sort of software app or other data processing engine that generates the virtual apps 1228 that provide data and/or services to the tenant devices 1240. In a typical embodiment, the app platform 1210 gains access to processing resources, communications interface and other features of the processing hardware 1204 using any sort of conventional or proprietary operating system 1208. The virtual apps 1228 are typically generated at run-time in response to input received from the tenant devices 1240. For the illustrated embodiment, the app platform 1210 includes a bulk data processing engine 1212, a query generator 1214, a search engine 1216 that provides text indexing and other search functionality, and a runtime app generator 1220. Each of these features may be implemented as a separate process or other module, and many equivalent embodiments could include different and/or additional features, components or other modules as desired.

The runtime app generator 1220 dynamically builds and executes the virtual apps 1228 in response to specific requests received from the tenant devices 1240. The virtual apps 1228 are typically constructed in accordance with the tenant-specific metadata 1238, which describes the particular tables, reports, interfaces and/or other features of the particular app 1228. In various embodiments, each virtual app 1228 generates dynamic web content that can be served to a browser or other tenant program 1242 associated with its tenant device 1240, as appropriate.

The runtime app generator 1220 suitably interacts with the query generator 1214 to efficiently obtain data 1232 from the multi-tenant database 1230 as needed in response to input queries initiated or otherwise provided by users of the tenant devices 1240. In a typical embodiment, the query generator 1214 considers the identity of the user requesting a particular function (along with the user's associated tenant), and then builds and executes queries to the multi-tenant database 1230 using system-wide metadata 1236, tenant specific metadata, pivot tables 1234, and/or any other available resources. The query generator 1214 in this example therefore maintains security of the common database by ensuring that queries are consistent with access privileges granted to the user and/or tenant that initiated the request.

With continued reference to FIG. 12, the bulk data processing engine 1212 performs bulk processing operations on the data 1232 such as uploads or downloads, updates, online transaction processing, and/or the like. In many embodiments, less urgent bulk processing of the data 1232 can be scheduled to occur as processing resources become available, thereby giving priority to more urgent data processing by the query generator 1214, the search engine 1216, the virtual apps 1228, etc.

In exemplary embodiments, the app platform 1210 is utilized to create and/or generate data-driven virtual apps 1228 for the tenants that they support. Such virtual apps 1228 may make use of interface features such as custom (or tenant-specific) screens 1224, standard (or universal) screens 1222 or the like. Any number of custom and/or standard objects 1226 may also be available for integration into tenant-developed virtual apps 1228. As used herein, "custom" should be understood as meaning that a respective object or app is tenant-specific (e.g., only available to users associated with a particular tenant in the multi-tenant system) or user-specific (e.g., only available to a particular subset of users within the multi-tenant system), whereas "standard" or "universal" apps or objects are available across multiple tenants in the multi-tenant system.

The data 1232 associated with each virtual app 1228 is provided to the multi-tenant database 1230, as appropriate, and stored until it is requested or is otherwise needed, along with the metadata 1238 that describes the particular features (e.g., reports, tables, functions, objects, fields, formulas, code, etc.) of that particular virtual app 1228. For example, a virtual app 1228 may include a number of objects 1226 accessible to a tenant, wherein for each object 1226 accessible to the tenant, information pertaining to its object type along with values for various fields associated with that respective object type are maintained as metadata 1238 in the multi-tenant database 1230. In this regard, the object type defines the structure (e.g., the formatting, functions and other constructs) of each respective object 1226 and the various fields associated therewith.

Still referring to FIG. 12, the data and services provided by the server 1202 can be retrieved using any sort of personal computer, mobile telephone, tablet or other network-enabled tenant device 1240 on the network 1245. In an exemplary embodiment, the tenant device 1240 includes a display device, such as a monitor, screen, or another conventional electronic display capable of graphically presenting data and/or information retrieved from the multi-tenant database 1230, as described in greater detail below.

Typically, the user operates a conventional browser app or other tenant program 1242 executed by the tenant device 1240 to contact the server 1202 via the network 1245 using a networking protocol, such as the hypertext transport protocol (HTTP) or the like. The user typically authenticates his or her identity to the server 1202 to obtain a session identifier ("Session ID") that identifies the user in subsequent communications with the server 1202. When the identified user requests access to a virtual app 1228, the runtime app generator 1220 suitably creates the app at run time based upon the metadata 1238, as appropriate. However, if a user chooses to manually upload an updated file (through either the web based user interface or through an API), it will also be shared automatically with all of the users/devices that are designated for sharing.

As noted above, the virtual app 1228 may contain Java, ActiveX, or other content that can be presented using conventional tenant software running on the tenant device 1240; other embodiments may simply provide dynamic web or other content that can be presented and viewed by the user, as desired. As described in greater detail below, the query generator 1214 suitably obtains the requested subsets of data 1232 from the multi-tenant database 1230 as needed to populate the tables, reports or other features of the particular virtual app 1228. In various embodiments, app 1228 embodies the functionality of an interactive performance review template linked to a database of performance metrics, as described below in connection with FIGS. 1-11.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various tasks performed in connection with performance metric monitoring may be performed by software, hardware, firmware, or any combination thereof. For illustrative purposes, the following description of object capture, shared display, and process may refer to elements mentioned above in connection with FIGS. 1-12. In practice, portions of process of FIGS. 1-12 may be performed by different elements of the described system, e.g., mobile clients, agents, in-app apps etc. It should be appreciated that process of FIGS. 1-12 may include any number of additional or alternative tasks, the tasks shown in FIGS. 1-12 need not be performed in the illustrated order, and process of the FIGS. 1-12 may be incorporated into a more comprehensive procedure or process having additional functionality not described in detail herein. Moreover, one or more of the tasks shown in FIG. 1-12 could be omitted from an embodiment of the process shown in FIGS. 1-12 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automated testing system for measuring performance metrics of apps, comprising:
    at least one processor deployed on a server being programmed to implement the measuring of metrics for the performance testing by the server of a plurality of app coupled to the server;
    the at least one processor scheduling performance testing of a plurality of apps to generate a set of performance metrics from a client, server and device relating to performance of each app wherein the performance metrics comprises processing times and requests associated with the app, wherein the scheduling performance testing of each app is executed by a combination of the client, server, and device comprising different networks, operating systems, and browsers;
    the at least one processor having a performance engine to capture the set of performance metrics of each app from the client, server and device, and further for organizing the set of performance metrics into categories based on an instrumentation and profile of each app wherein the categories comprise clusters of the performance metrics;
    the at least one processor having a graphic user interface for rendering the set of performance metrics in a manner to facilitate comparisons between each cluster and category of the set of performance metrics; and
    the at least one processor having an input to receive data from processors of the client, server, and network to present in a first instance in a waterfall graph of event logging and processing time for events across the client, server and network to: visually monitor processing at different stages of the instrumentation, determine lengths of processing time at each of the different stages and determine whether an event is processed faster at the server than at the network; and in a second instance to present in a flame graph for discrete events of creation time for each component to: inspect component creation time on a page, and inspect the component creation time for a performance hot spot whereby a bottleneck in an event and component processing is identified visually at an event level across the client, server and network and at a component level across components of the page related to the client, server and network by a particular display of the waterfall and flame graphs.

2. The system of claim 1, wherein the generated set of performance metrics from the networks comprise performance metrics related to a plurality of different network protocols.

3. The system of claim 1, wherein the controller is configured to implement a set of instructions to download the plurality of apps, load pages and capture performance metrics for each page of the app across a plurality of scenarios from the server to each client using different combinations of the network, operating system and browser.

4. The system of claim 1, wherein the performance testing comprises testing on different sets of at least two browsers.

5. The system of claim 1, wherein the performance testing comprises testing on sets of at least two operating systems.

6. The system of claim 1, further comprising:
    a database which stores the set of performance metrics which is captured and enables the controller to retrieve the set of performance metrics for automated analysis and trending by the performance engine to determine an improvement or regression of a feature of an app through an app development cycle.

7. The system of claim 1, further comprising:
    a plurality of types of performance metrics provided of the client, server and network at least comprising: client metrics of page loading and rendering time, component loading and rendering time, and client processor profiles; server metrics of server processing time, request time of each layer of a server, number of calls and latency time for app services to a server, application program interfaces (APIs) executions at a server, and server database structured query language (SQL) statements; and network metrics of network requests, time in a network layer, and network navigation timing API metrics.

8. A method for measuring performance metrics of apps during an app development cycle, the method comprising:

implementing performance testing by a server of a plurality of apps coupled to the server by programming a processor of the server to schedule performance testing of a plurality of apps to generate a set of performance metrics from a client, server and network relating to performance of each app wherein the set of performance metrics comprises processing and request times associated with the app, wherein the scheduling performance testing of each app is executed from a processor of the server for a combination of clients, servers, and networks comprising different devices, operating systems, and browsers;

capturing by a performance engine the set of performance metrics of each app from the clients, servers and networks, and further organizing the set of performance metrics into categories based on an instrumentation and profile of each app wherein the categories comprise clusters of the performance metrics;

rendering by a user interface the set of performance metrics in a manner to facilitate comparisons between each cluster and category of the set of performance metrics for automated analysis and trending by the performance engine to determine an improvement or regression of a feature of an app through the app development cycle; and receiving data from the processor of the client, server, and network to present in a first instance in a waterfall graph of event logging and processing time for events across the client, server and network to: visually monitor processing at different stages of the instrumentation, determine lengths of processing time at each of the different stages and determine whether an event is processed faster at the server than at the network; and in a second instance to present in a flame graph for discrete events of creation time for each component to: inspect component creation time on a page, and inspect the component creation time for a performance hot spot whereby a bottleneck in an event and component processing is identified visually at an event level across the client, server and network and at a component level across components of the page related to the client, server and network by a particular display of the waterfall and flame graphs.

9. The method of claim 8, wherein the generated set of metrics from the networks comprises performance metrics related to a plurality of different network protocols.

10. The method of claim 8, wherein the controller is configured to implement a set of instructions to download the app, load pages and capture performance metrics for each page of the app across a plurality of scenarios from the server to each client using a different combinations of the network, operating system and browser.

11. The method of claim 8, wherein the performance testing comprises testing on different sets of at least two browsers.

12. The method of claim 8, wherein the performance testing comprises testing on sets of at least two operating systems.

13. The method of claim 8, further comprising:
storing by a database the set of performance metrics which is captured and enabling the controller to retrieve the set of performance metrics for automated analysis and trending by the performance engine to determine an improvement or regression of a feature of an app through an app development cycle.

14. The method of claim 8, further comprising:
providing a plurality of types of performance metrics of the client, server and network at least comprising: client metrics of page loading and rendering time, component loading and rendering time, and client processor profiles; server metrics of server processing time, request time of each layer of a server, and number of calls and time taken for app services, APIs executions at a server, and server database SQL statements; and network metrics of requests, time in a network layer, and network navigation timing API metrics.

15. A system comprising:
at least one processor; and
at least one computer-readable storage device comprising instructions that when executed causes execution of a method of cloud automated testing for measuring performance metrics of apps during an app development cycle, the method comprising:
configuring a first module to connect a plurality of clients to an app server running the app;
configuring a second module to implement a plurality of operating systems;
configuring a third module to implement a plurality of web browsers;
configuring a fourth module to implement a plurality of network connections; and
downloading the app, and loading pages and capturing performance metrics for each page of the downloaded app across a plurality of scenarios from the app server to each client using a different combinations of the plurality of operating systems, web browsers and network connections; and
configuring a fifth module to implement a user interface for rendering the captured performance metrics during the app development cycle, the rendering comprising:
receiving data from processors of the client, server and network to cluster together for events across the client, server and network, and for particular discrete events of a page flow of creation time for each component on a page during the page flow to identify a bottleneck in an event and component processing at an event level across the client, server and network and at a component level across components of the page by a display of a waterfall graph and a flame graph for each event and component by:
in a first instance in the waterfall graph display of event logging and processing time for events across the client, server and network to: visually monitor processing at different stages of instrumentation, determine lengths of processing time at each of the different stages and determine whether an event is processed faster at the server than at the network; and in a second instance to present in the flame graph display for discrete events of creation time for each component to: inspect component creation time on a page, and inspect the component creation time for a performance hot spot.

16. The system of claim 15, further comprising:
capturing a set of performance metrics of a client, server and network by a performance engine of each app from at least the client, server and network, and further organizing the set of performance metrics into categories based on an instrumentation and profile of each app wherein the categories of the performance metrics include clusters consisting of at least the client, server and network.

17. The system of claim 15, further comprising:
storing by a database the performance set of metrics which is captured and retrieving the performance set of metrics for automated analysis and trending by performance engine to determine an improvement or regression of a feature of an app through an app development cycle.

18. The system of claim 15, wherein the performance testing comprises testing on different sets of at least two operating systems.

19. The system of claim 15, wherein the performance testing comprise testing on different sets of at least two browsers.

20. The system of claim 15, wherein the generated set of metrics from the networks comprising performance metrics related to a plurality of different network protocols.

21. The system of claim 15, further comprising:
providing a plurality of types of performance metrics of the client, server and network at least comprising: client metrics of page loading and rendering time, component loading and rendering time, and client processor profiles; server metrics of server processing time, request time of each layer of a server, and number of calls and time taken for app services, APIs executions at a server, and server database SQL statements; and network metrics of requests, time in a network layer, and network navigation timing API metrics.

* * * * *